(12) United States Patent
Leu

(10) Patent No.: US 7,193,752 B2
(45) Date of Patent: Mar. 20, 2007

(54) AUTOMATIC FEEDING APPARATUS

(75) Inventor: William Leu, Taipei (TW)

(73) Assignee: BenQ Corporation, Taoyuan (TW)

( * ) Notice: Subject to any disclaimer, the term of this patent is extended or adjusted under 35 U.S.C. 154(b) by 358 days.

(21) Appl. No.: 10/991,101

(22) Filed: Nov. 17, 2004

(65) Prior Publication Data

US 2005/0184451 A1    Aug. 25, 2005

(30) Foreign Application Priority Data

Nov. 21, 2003   (TW) .............................. 92220581 U

(51) Int. Cl.
*H04N 1/04*      (2006.01)

(52) U.S. Cl. ....................................... 358/498; 358/496

(58) Field of Classification Search ................ 358/498, 358/496, 482, 483, 474, 505; 399/367, 374; 271/8.1, 10.15, 12, 264

See application file for complete search history.

(56) References Cited

U.S. PATENT DOCUMENTS 6,128,105 A * 10/2000 Ishikawa et al. ............ 358/483
6,154,294 A * 11/2000 Craig et al. .................. 358/483
6,765,697 B2 * 7/2004 Toyoda et al. ............... 358/471

FOREIGN PATENT DOCUMENTS

JP            05122453 A  *  5/1993

* cited by examiner

*Primary Examiner*—Cheukfan Lee
(74) *Attorney, Agent, or Firm*—Quintero Law Office

(57) ABSTRACT

An automatic feeding apparatus for print media. The automatic feeding apparatus includes a base plate, a protective layer and a conveying mechanism. The base plate has a first portion and a second portion. The protective layer is disposed on the second portion to support and protect the print media. The protective layer has a predetermined thickness. The conveying mechanism is disposed on the base plate to convey the print media to the first portion of the base plate from the protective layer and has a first rolling member and a second rolling member connected thereto. The second rolling member is above the protective layer.

19 Claims, 5 Drawing Sheets

AUTOMATIC FEEDING APPARATUS

BACKGROUND OF THE INVENTION

1. Field of the Invention

The present invention relates to an automatic feeding apparatus, and in particular to an automatic feeding apparatus with a protective layer.

2. Description of the Related Art

A scanner or printer usually has an automatic feeding device to convey media sheets. The automatic feeding device comprises various structures.

Referring to FIG. 1, a conventional automatic feeding device 1 includes multiple driving rollers 11, multiple passive rollers 12 and a transmission shaft 13. The passive rollers 12 are disposed under the driving rollers 11, and the driving rollers 11 are rotated by the transmission shaft 13. As shown in FIG. 1, a media sheet P is input to the interior of a scanner or printer, entering the contact area between the driving rollers 11 and the passive rollers 12. The driving rollers 11 then convey the media sheet P through the contact area. The automatic feeding device 1, however, has a drawback as follows. When the media sheet P has a finished surface or is delicate, it can be easily damaged due to contact with the driving rollers 11 and the passive rollers 12.

Referring to FIG. 2, another conventional automatic feeding device 2 includes multiple rollers 21 and a transmission shaft 22. The rollers 21 are disposed on the transmission shaft 22 and are rotated by the transmission shaft 22. Additionally, a transparent glass panel S is disposed under the rollers 21. As shown in FIG. 2, a media sheet P is conveyed onto the transparent glass panel S by the rollers 21. The media sheet P slides on the transparent glass panel S to be scanned. The transparent glass panel S is glossy, such that the image on the media sheet P is not damaged. Nevertheless, when the media sheet P is a photograph with a glossy surface, adhesion between the surfaces can occur. At this point, the media sheet P cannot be normally conveyed by the automatic feeding device 2. Moreover, dust or other particles often accumulate on the transparent glass panel S after long use of the automatic feeding device 2. Thus, the transparent glass panel S and image on the media sheet P may be scraped or damaged.

Hence, there is a need for an improved automatic feeding apparatus, with a protective layer to protect media from damage.

SUMMARY OF THE INVENTION

Accordingly, an object of the invention is to provide an automatic feeding apparatus for print media. The automatic feeding apparatus comprises a base plate, a protective layer and a conveying mechanism. The base plate has a first portion and a second portion. The protective layer is disposed on the second portion to support and protect print media. The protective layer has a predetermined thickness. The conveying mechanism is disposed on the base plate to convey the print media to the first portion of the base plate from the protective layer and has a first rolling member and a second rolling member connected thereto. The second rolling member is above the protective layer.

The base plate or the first portion thereof is transparent or a glass panel.

The automatic feeding apparatus further comprises a scanning module disposed under the first portion of the base plate.

The protective layer is composed of a soft, anti-electrostatic, dust-proof, or napped material.

The protective layer is attached to the second portion of the base plate.

The first rolling member is connected to the second rolling member by means of a conveyer such that the first and second rolling members rotate synchronously.

The second rolling member swings relative to the first rolling member.

The automatic feeding apparatus further comprises a sensor disposed on the second portion of the base plate to detect the print media.

The automatic feeding apparatus further comprises a sensor disposed on the protective layer to detect the print media.

The automatic feeding apparatus further comprises a guiding plate connected to the first portion of the base plate. The print media is conveyed to the guiding plate. The first rolling member is above the guiding plate.

The print media can comprise a photograph, negative or paper sheet.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
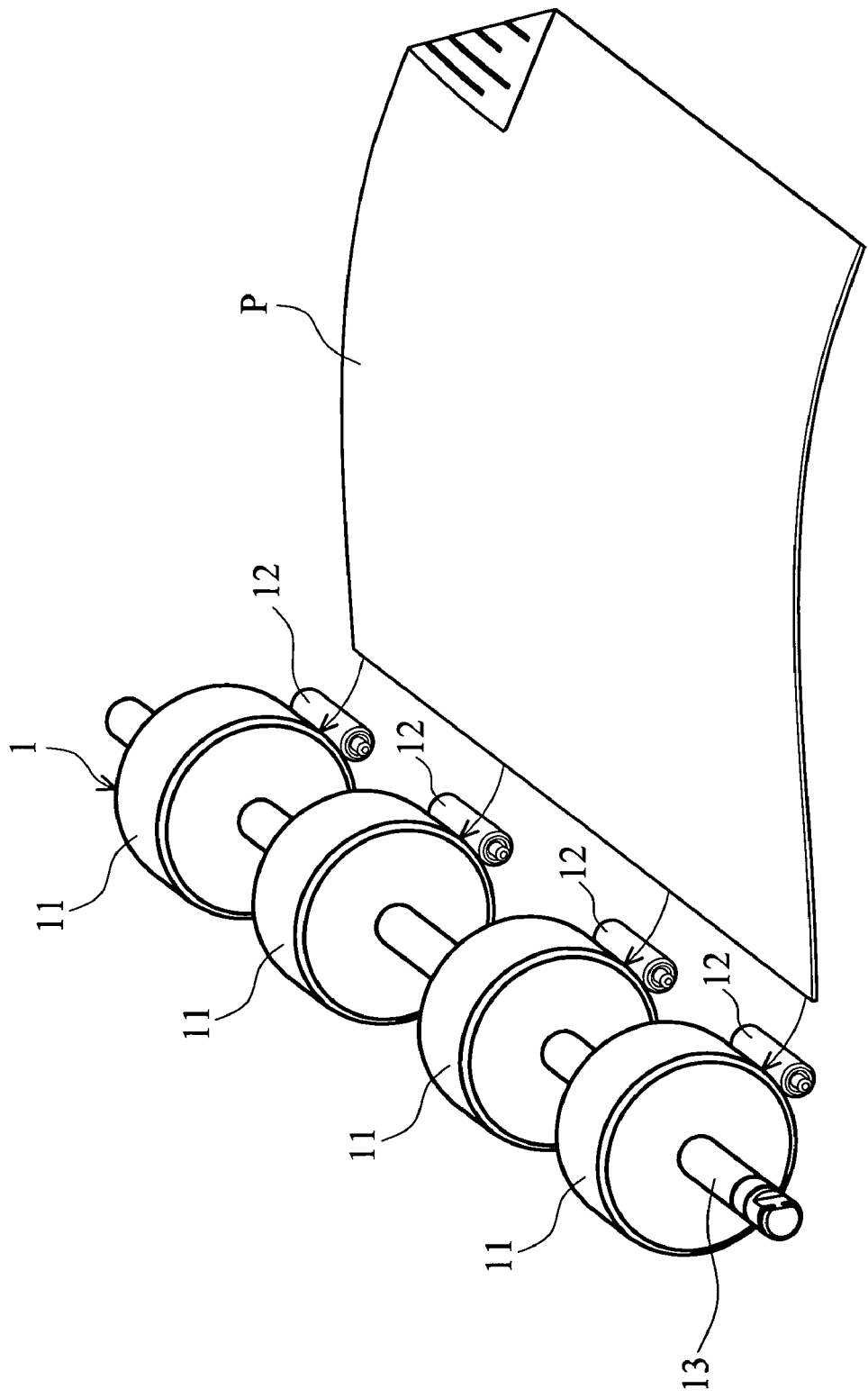
FIG. 1 is a schematic perspective view showing a conventional automatic feeding device.
Figure 2:
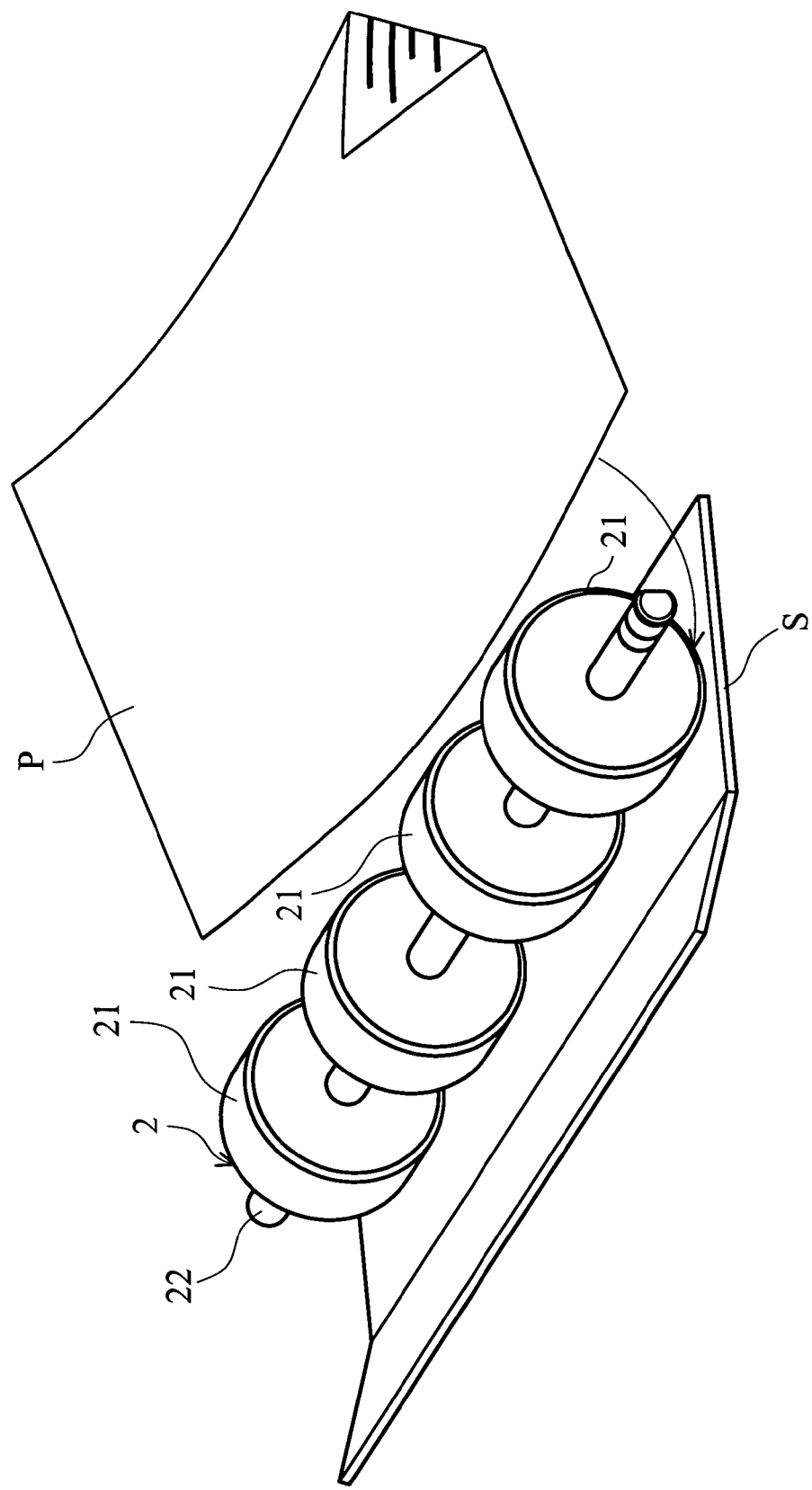
FIG. 2 is a schematic perspective view showing another conventional automatic feeding device.
Figure 3:
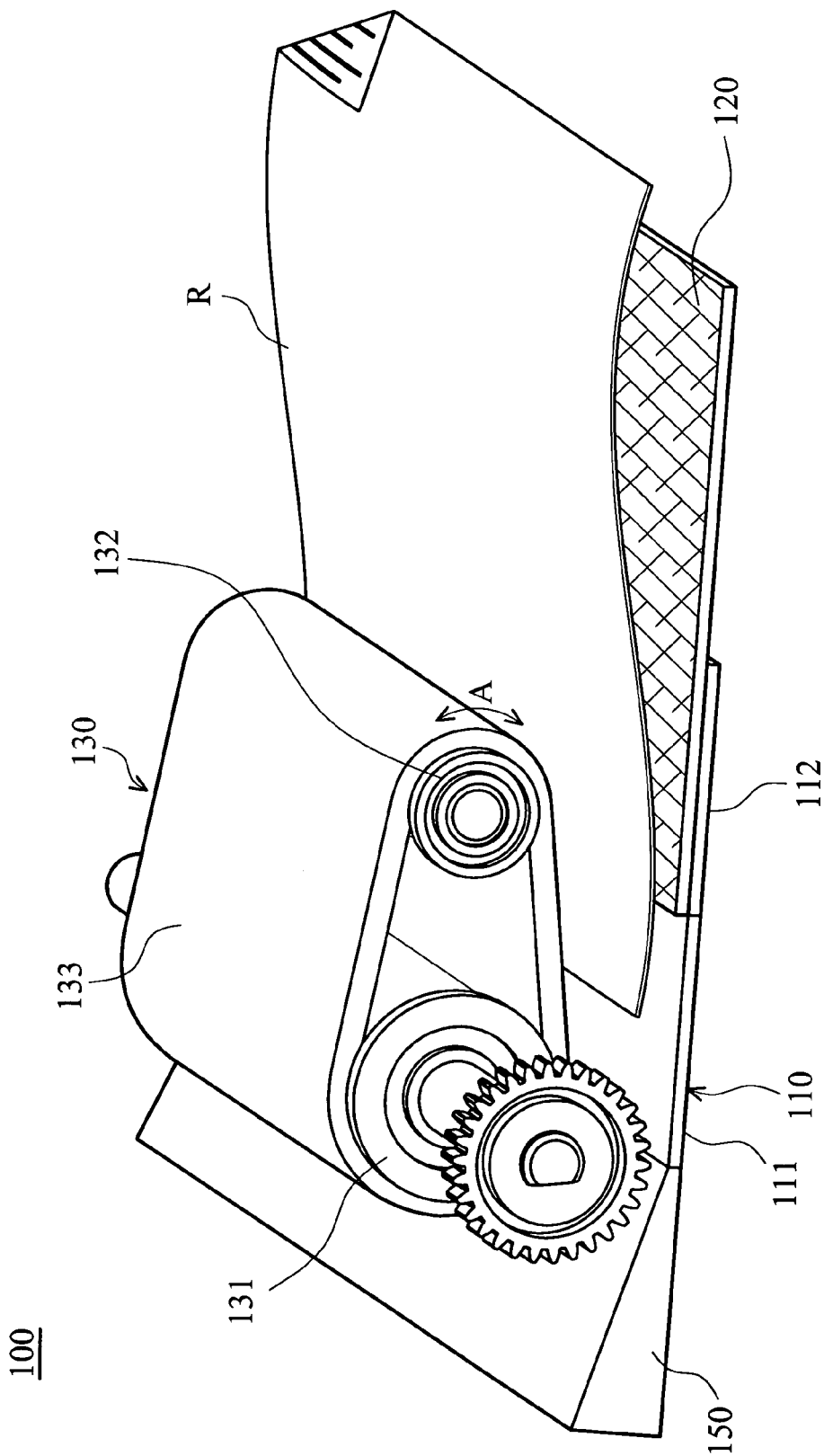
FIG. 3 is a schematic perspective view showing the automatic feeding apparatus of the invention.

Referring to FIG. 3, the automatic feeding apparatus 100 of this embodiment conveys print media R, such as a photograph with a glossy surface, negative, or paper sheet, into a printer or scanner.

As shown in FIG. 3, the automatic feeding apparatus 100 includes a base plate 110, a protective layer 120 and a conveying mechanism 130.

The base plate 110 has a first portion 111 and a second portion 112. In this embodiment, the base plate 110 may be a transparent glass panel, or the first portion 111 thereof is transparent. Specifically, when the automatic feeding apparatus 100 is employed in a scanner, a scanning module 140 (shown in FIGS. 4A, 4B and 4C) is disposed under the first portion 111 of the base plate 110. At this point, the first portion 111 must be transparent to pass light. Additionally, a guiding plate 150 is connected to the first portion 111 of the base plate 110. Specifically, when the automatic feeding apparatus 100 is employed in a printer, the printing area thereof is connected to the guiding plate 150.

The protective layer 120 is disposed on and is attached to the second portion 112 of the base plate 110 to support and protect the print media R. The protective layer 120 has a predetermined thickness, such that the horizontal position thereof is higher than that of the first portion 111 after being disposed on the second portion 112. Specifically, in order for the protective layer 120 to protect the print media R from damage, it is of a soft material, such as an anti-electrostatic, dust-proof, or napped material.

Figure 4A:
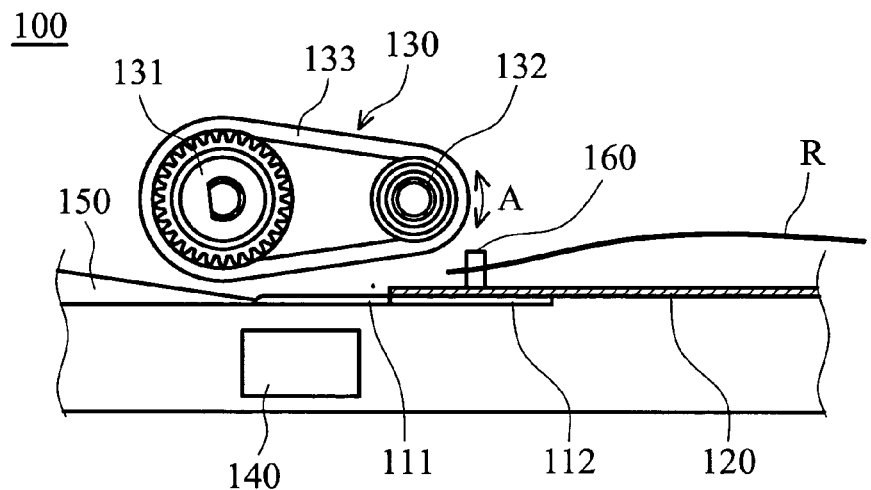
FIG. 4A is a schematic side view showing the operation of the automatic feeding apparatus of the invention.
Figure 4B:
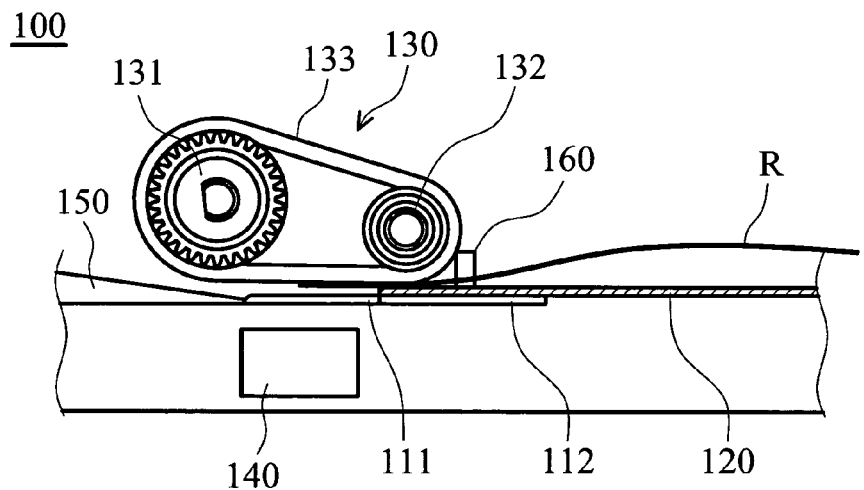
FIG. 4B is a schematic side view showing the operation of the present automatic feeding apparatus according to FIG. 4A.
Figure 4C:
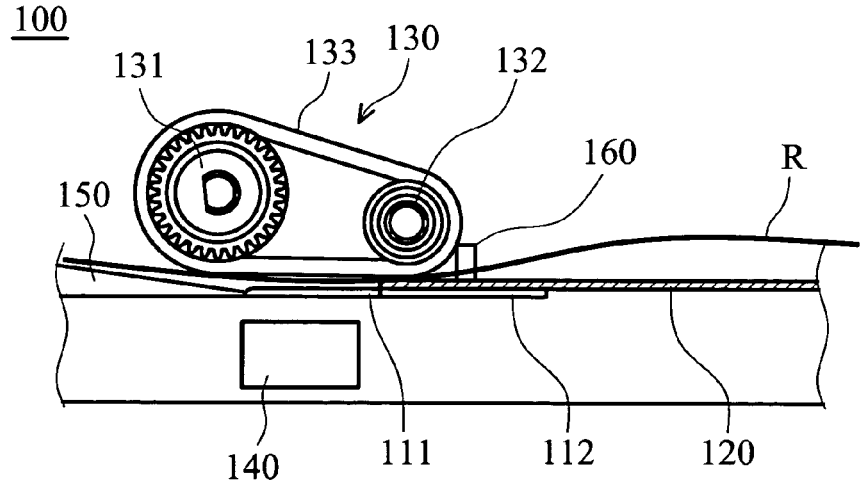
FIG. 4C is a schematic side view showing the operation of the present automatic feeding apparatus according to FIG. 4B.

The conveying mechanism 130 is disposed on the base plate 110. Specifically, the conveying mechanism 130 has a first rolling member 131 and a second rolling member 132. The first rolling member 131 is connected to the second rolling member 132 by means of a conveyer 133 such that the first rolling member 131 and second rolling member 132 rotate synchronously. As shown in FIGS. 4A, 4B and 4C, the second rolling member 132 is above the protective layer 120 while the first rolling member 131 is above the guiding plate 150. Additionally, the second rolling member 132 swings relative to the first rolling member 131 in the direction shown by arrow A.

Moreover, as shown in FIGS. 4A, 4B and 4C, the automatic feeding apparatus 100 has a sensor 160. The sensor 160 is disposed on the second portion 112 of the base plate 110 or protective layer 120 to detect the print media R.

The following description explains the operation of the automatic feeding apparatus 100.

Figure 5:
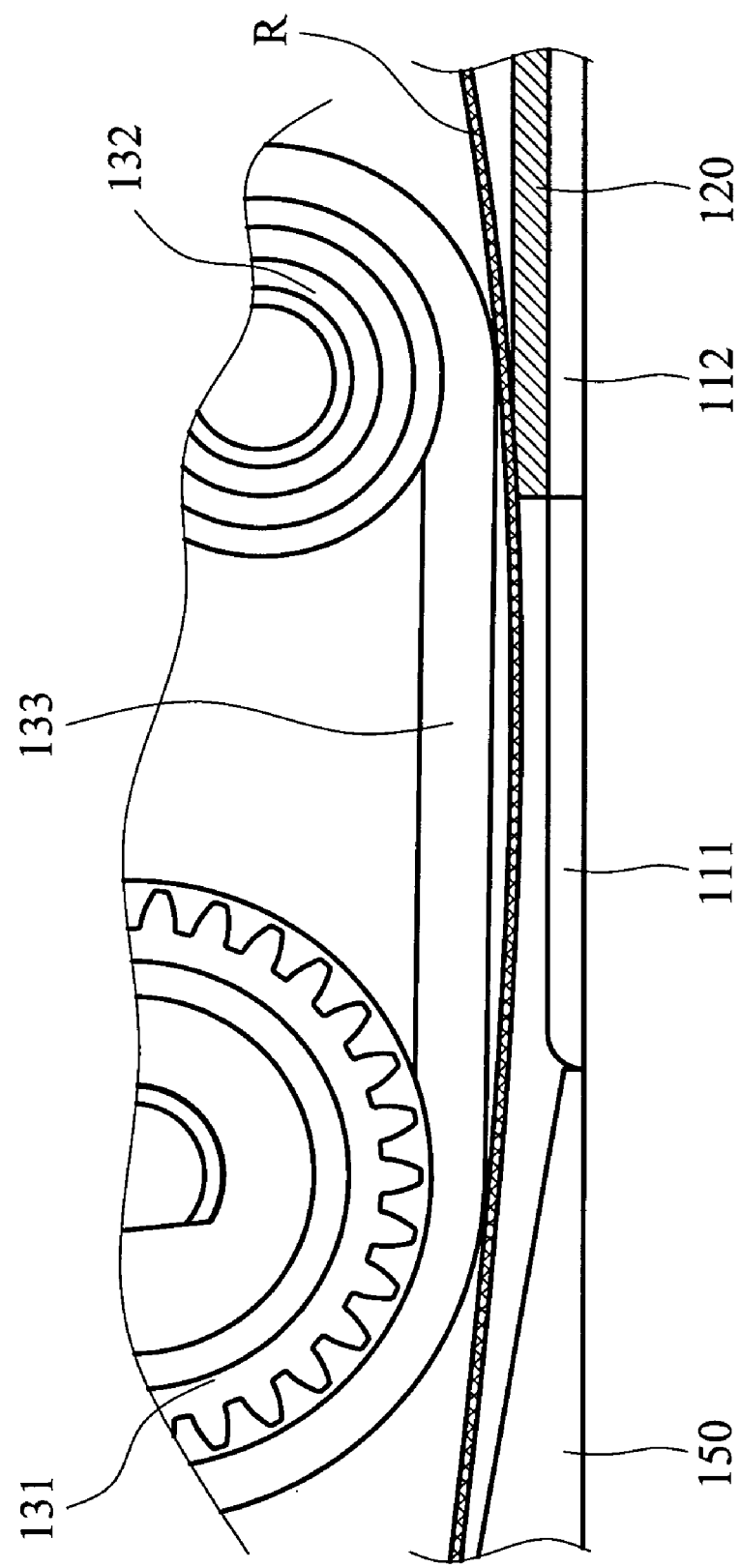
FIG. 5 is a partial enlarged view according to FIG. 4C.

As shown in FIG. 4A and FIG. 4B, when the print media R is delivered to the protective layer 120 below the second rolling member 132 from the exterior of the automatic feeding apparatus 100, the sensor 160 detects the print media R and outputs a corresponding signal to actuate the second rolling member 132 to direct the print media R in the direction shown by the arrow A. The first rolling member 131 and second rolling member 132 then rotate to convey the print media R with the conveyer 133 to the first portion 111 of the base plate 110 from the protective layer 120. As shown in FIG. 4C, the print media R is continuously conveyed onto the guiding plate 150. The print media R is then conveyed out of the automatic feeding apparatus 100 or into the printing area of the printer by the first rolling member 131 (conveyer 133). Specifically, as shown in FIG. 5, when conveyed through the first portion 111, the print media R is separated from the first portion 111 by the predetermined thickness of the protective layer 120. Namely, a gap exists between the print media R and the first portion 111. Thus, the print media R does not directly contact the first portion 111 when sliding thereon, avoiding scraping, damage, or adhesion to the first portion 111.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An automatic feeding apparatus for feeding print media, comprising:
   a base plate, with a first portion and a second portion;
   a protective layer disposed on the second portion to support and protect the print media, wherein the protective layer has a predetermined thickness; and
   a conveying mechanism disposed on the base plate to convey the print media to the first portion of the base plate from the protective layer and having a first rolling member and a second rolling member connected thereto, the second rolling member above the protective layer.

2. The automatic feeding apparatus as claimed in claim 1, wherein the base plate is transparent.

3. The automatic feeding apparatus as claimed in claim 2, wherein the base plate is a glass panel.

4. The automatic feeding apparatus as claimed in claim 1, wherein the first portion of the base plate is transparent.

5. The automatic feeding apparatus as claimed in claim 4, further comprising a scanning module disposed under the first portion of the base plate.

6. The automatic feeding apparatus as claimed in claim 1, wherein the protective layer comprises a soft material.

7. The automatic feeding apparatus as claimed in claim 1, wherein the protective layer comprises an anti-electrostatic material.

8. The automatic feeding apparatus as claimed in claim 1, wherein the protective layer comprises a dust-proof material.

9. The automatic feeding apparatus as claimed in claim 1, wherein the protective layer comprises a napped material.

10. The automatic feeding apparatus as claimed in claim 1, wherein the protective layer is attached to the second portion of the base plate.

11. The automatic feeding apparatus as claimed in claim 1, wherein the first rolling member is connected to the second rolling member by means of a conveyer such that the first and second rolling members rotate synchronously.

12. The automatic feeding apparatus as claimed in claim 1, wherein the second rolling member swings relative to the first rolling member.

13. The automatic feeding apparatus as claimed in claim 1, further comprising a sensor disposed on the second portion of the base plate to detect the print media.

14. The automatic feeding apparatus as claimed in claim 1, further comprising a sensor disposed on the protective layer to detect the print media.

15. The automatic feeding apparatus as claimed in claim 1, further comprising a guiding plate connected to the first portion of the base plate, the print media conveyed to the guiding plate.

16. The automatic feeding apparatus as claimed in claim 15, wherein the first rolling member is above the guiding plate.

17. The automatic feeding apparatus as claimed in claim 1, wherein the print media is a photograph.

18. The automatic feeding apparatus as claimed in claim 1, wherein the print media is a negative.

19. The automatic feeding apparatus as claimed in claim 1, wherein the print media is a paper sheet.

* * * * *